UNITED STATES PATENT OFFICE.

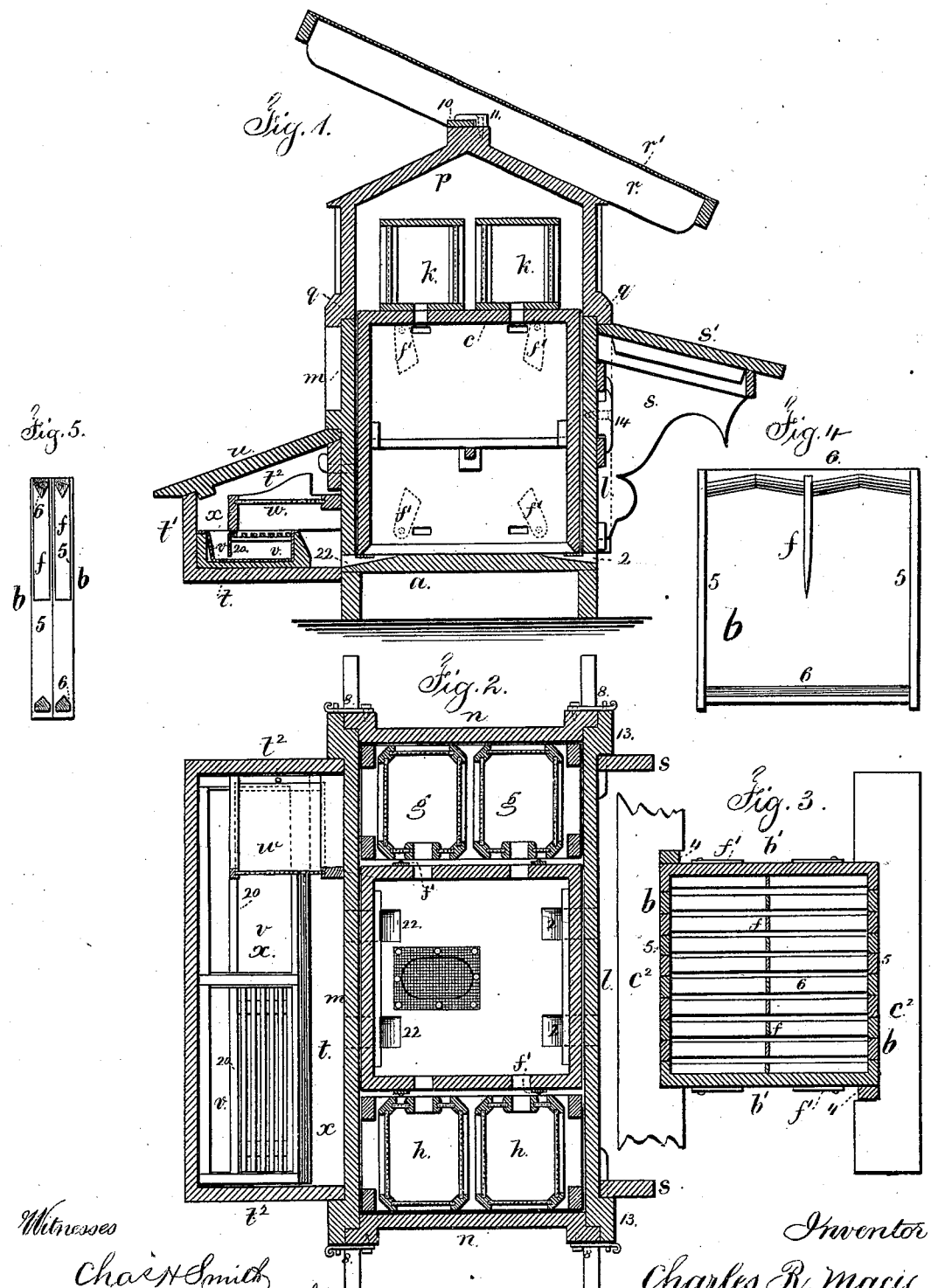

CHARLES R. MACY, OF LAMINGTON, ASSIGNOR TO HIMSELF AND ISAAC M. HOLCOMB, OF PLAINFIELD, AND JOHN A. THICKSTUN, OF NORTH PLAINFIELD, NEW JERSEY.

IMPROVEMENT IN BEE-HIVES.

Specification forming part of Letters Patent No. 202,114, dated April 9, 1878; application filed December 20, 1877.

*To all whom it may concern:*

Be it known that I, CHARLES R. MACY, of Lamington, in the county of Somerset and State of New Jersey, have invented an Improvement in Bee-Hives, of which the following is a specification:

I make use of a hive formed of frames peculiarly constructed to facilitate the attachment of the comb and not to interfere with the breeding. At the sides of these and above them there are removable honey-boxes. The surrounding case is hooked together, so that it can be opened at either side or end for the removal or adjustment of the full honey-boxes. There is a removable shade in front of the entrance, to exclude rain or protect the entrance from the sun. There is also a removable cover or sun-shade above the hive, to protect the same from the direct rays of the sun during the middle of the day. There is a feeding-trough, constructed so that it is accessible only to the bees of the hive, and it may be supplied with proper food from outside, and there is no risk of the attendant being stung.

In the drawing, Figure 1 is a vertical section of the hive complete. Fig. 2 is a sectional plan of the same. Fig. 3 is a sectional plan of the hive-frames. Fig. 4 is an elevation of one frame separately, and Fig. 5 is a cross-section of two of the frames.

The base $a$ of the hive is of suitable size, and the center part receives above it the hive proper, into which are the entrances 2 2 2 at the bottom.

In Figs. 1 and 2 the hive is shown as a box only, as this may sometimes be employed; but for hiving, swarming, and breeding many persons prefer and use the frames $b\ b$. These are grouped together, as seen in Fig. 3, with the end partitions $b'$ and top $c$, forming a box-shaped inclosure similar to the box in Figs. 1 and 2.

The frames, when removed from place to place for hiving purposes, are, with the partitions $b'$, held together by the clamping-bars $c^2\ c^2$, that are placed each side of the frames, and secured by the wedges 4 4, so that the frames can be moved as a whole and placed upon the base $a$.

Each frame is composed of the front and back vertical slats 5 5, joined at the bottom by the cross-rail 6, that is slightly narrower than the slats 5, to allow the bees to pass up between them; and the top of such rail may be flat or beveled, to facilitate cleanliness in the hive; and the upper cross-bars 6 are beveled or knife-edged, and have zigzag angles to correspond, or nearly so, with the angle of the cells, so that the comb will be formed thereon with great regularity.

There are also central vertical tongues $f$, to aid in holding up the comb. These tongues should project upwardly at the center portion of the hive, so that the bees will congregate upon the portion of the comb supported by them while breeding, and the tongues toward the ends should hang from the top, for sustaining the combs that form the store of honey.

At each side of the hive are openings, with swinging covers $f'$, that allow the bees to pass into the honey-boxes $g\ g$ or $h\ h$ at the ends of the hive. These are made with wooden bottoms and tops and corner-posts, receiving glasses, as usual.

Above the hive there are also boxes $k\ k$, similarly made, and to which the bees have access from the top $c$ of the hive by means of openings through such top, as seen in Fig. 1.

The exterior walls of the hive are made of the front $l$, back $m$, and ends $n$. These come together at the angles with rabbets, as seen in Fig. 2, and they are hooked together at 8. This allows either end, or the front or the back, or all sides, to be removed without disturbing the other parts of the hive or honey-boxes, the object being to allow for inspecting, removing, adjusting, and replacing honey-boxes.

The top of the hive is formed with a peaked roof, $p$, with rabbeted sides at $q$, setting above and outside the front $l$, back $m$, and ends $n$. This roof is to be lifted off or raised before removing either of the sides.

A light frame, $r$, of a size sufficient to extend beyond the hive, is covered with muslin, paper, or similar suitable material at $r'$; and there is a cross-piece, 10, resting upon the ridge-pole of the roof, and secured by buttons 11. This forms a shield to protect the hive from the heat of the sun. It may be removed in cool or windy weather without injury to the hive.

Between the corner-pieces 13 of the front $l$ are the brackets $s$, supporting the shield or cover $s'$, that is buttoned at 14 to the front. This protects the entrances 2 to the hive from the sun and from rain or moisture.

At the back of the hive are the openings 22, leading into the feeding-room $x$, formed of the bottom $t$, back $t^1$, and ends $t^2$, removably connected with the said back $m$, and there is a removable cover, $u$.

Within the feeding-room is the trough $v$, having a partition, 20, lengthwise of it. This trough can be slipped up against the back $m$ and close the openings 22, so that the bees cannot get into the feeding-room. This is done when the bees can get food elsewhere. There is also a glass, $w$, in a frame that is supported upon ledges at the end of the feeding-room.

When the trough $v$ is in the position shown in Fig. 1, the edge of the frame corresponds with the partition 20 in the trough, so that food can be poured into the trough, and it will run beneath the partition; but the bees cannot escape; hence the person feeding the bees is not liable to be stung.

I am aware that the frames for the comb have been made with knife-edges, and that in some instances these edges have been inclined; also, that inward projections have been made at the sides of the frame. In my frame the vertical tongues and the zigzag knife-edges insure a straight comb and support the central portion, as aforesaid.

I find that bees attach their combs to the vertical tongues, and terminate the lower part of the comb below the lower ends with more regularity than would be the case if the tongue passed vertically from side to side of the comb, and in cases where the horizontal tongues have been introduced the bees avoid the same, and do not attach the comb thereto.

I claim as my invention—

1. The frames $b$, made with beveled and zigzag edges upon the lower surfaces of the cross-bars 6, and provided with the vertical tongues $f$, substantially as and for the purposes set forth.

2. The feeding-chamber $x$ at one side of the hive, and provided with a sliding feeding-trough, $v$, partition 20, and frame and glass $w$, substantially as set forth.

3. Jointly, the front $l$, the bracket-frame $s$, cover $s'$, and buttons 14, as described.

4. The frame $r$, provided with a central cross-piece, 10, and covered with muslin or similar material, jointly with the ridge-pole of the roof of the bee-hive, having buttons 11, for the purposes and as set forth.

Signed by me this 15th day of December, A. D. 1877.

C. R. MACY.

Witnesses:
LEMUEL W. SERRELL,
GEORGE SERRELL.